(12) United States Patent
Wager et al.

(10) Patent No.: US 10,237,851 B2
(45) Date of Patent: *Mar. 19, 2019

(54) METHODS AND APPARATUSES FOR RESOURCE MANAGEMENT IN A MULTI-CARRIER TELECOMMUNICATIONS SYSTEM

(71) Applicant: TELEFONAKTIEBOLAGET L M ERICSSON (PUBL), Stockholm (SE)

(72) Inventors: Stefan Wager, Espoo (FI); Stefan Parkvall, Stockholm (SE); Magnus Stattin, Sollentuna (SE); Ghyslain Pelletier, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,473

(22) Filed: Nov. 20, 2013

(65) Prior Publication Data

US 2014/0064250 A1    Mar. 6, 2014

Related U.S. Application Data

(63) Continuation of application No. 12/767,959, filed on Apr. 27, 2010, now Pat. No. 8,620,335.

(Continued)

(30) Foreign Application Priority Data

Aug. 21, 2009    (SE) .................. PCT/SE2009/050945

(51) Int. Cl.
*H04W 72/02*    (2009.01)
*H04L 5/00*    (2006.01)
(Continued)

(52) U.S. Cl.
CPC ............. *H04W 72/02* (2013.01); *H04L 5/001* (2013.01); *H04L 5/0094* (2013.01);
(Continued)

(58) Field of Classification Search
CPC ............. H04W 74/0833; H04W 72/02; H04W 72/042; H04W 74/002; H04W 74/006;
(Continued)

(56) References Cited

U.S. PATENT DOCUMENTS 7,738,437 B2 *    6/2010    Ma et al. ...................... 370/342
8,498,649 B2 *    7/2013    Seo ...................... H04L 5/0007
                                                370/319

(Continued)

FOREIGN PATENT DOCUMENTS

EP    1 909 523 A1    4/2008

OTHER PUBLICATIONS

Ericsson, Text Proposal for Dedicated Preamble Assignment, Sep. 22, 2008, 3GPP TSG-RAN, R2-085261.

(Continued)

*Primary Examiner* — Matthew C Sams
(74) *Attorney, Agent, or Firm* — Boisbrun Hofman, PLLC

(57) ABSTRACT

The embodiments of the present invention relate to apparatuses and methods for resource management in a multi-carrier system wherein a plurality of component carriers (CCs) is defined per cell. According to a method in an apparatus corresponding to a radio base station, a message is assembled comprising information on the structure of the cell served by the radio base station; the information including one or more CCs used in the cell that is/are available for a user equipment for performing initial access in the cell. The method also comprises, transmitting the assembled message to the user equipment and indicating to the user equipment to what resources to use for random access in the
(Continued)

cell. The exemplary embodiments of the present invention also relates to a method in the user equipment, to a radio base station and to a user equipment.

33 Claims, 8 Drawing Sheets

Related U.S. Application Data

(60) Provisional application No. 61/172,813, filed on Apr. 27, 2009.

(51) Int. Cl.

| | | |
|---|---|---|
| *H04W 74/00* | (2009.01) | |
| *H04W 74/08* | (2009.01) | |
| *H04W 36/00* | (2009.01) | |
| H04W 48/12 | (2009.01) | |
| H04W 72/04 | (2009.01) | |
| H04W 88/08 | (2009.01) | |

(52) U.S. Cl.
CPC ..... *H04W 36/0016* (2013.01); *H04W 74/006* (2013.01); *H04W 74/0833* (2013.01); H04L 5/0053 (2013.01); H04W 48/12 (2013.01); H04W 72/0453 (2013.01); H04W 88/08 (2013.01)

(58) Field of Classification Search
CPC .... H04W 72/04; H04W 48/12; H04L 5/0007; H04L 5/0053; H04L 5/0094; H04L 5/0048; H04L 27/2655; H04B 17/382
USPC ............ 455/450–453, 73, 509, 515, 68, 69; 370/252, 329, 330, 335, 341, 342, 479
See application file for complete search history.

(56) References Cited

U.S. PATENT DOCUMENTS

| | | | |
|---|---|---|---|
| 2004/0246998 A1* | 12/2004 | Ma et al. ....................... 370/527 |
| 2007/0047493 A1 | 3/2007 | Park et al. |
| 2008/0273610 A1* | 11/2008 | Malladi et al. ................ 375/260 |
| 2009/0092086 A1* | 4/2009 | Lee et al. ....................... 370/329 |
| 2010/0067470 A1* | 3/2010 | Damnjanovic et al. ...... 370/329 |
| 2010/0227569 A1* | 9/2010 | Bala et al. ....................... 455/73 |
| 2010/0232382 A1* | 9/2010 | Gauvreau et al. ............. 370/329 |
| 2010/0260136 A1* | 10/2010 | Fan et al. ....................... 370/330 |
| 2010/0285809 A1* | 11/2010 | Lindstrom et al. ............ 455/450 |
| 2010/0296467 A1* | 11/2010 | Pelletier ............... H04W 74/002 370/329 |
| 2010/0303039 A1* | 12/2010 | Zhang et al. .................. 370/331 |
| 2011/0003555 A1* | 1/2011 | Guo ........................... 455/67.11 |
| 2011/0014922 A1* | 1/2011 | Jen .................................. 455/450 |
| 2011/0021154 A1* | 1/2011 | Marinier et al. ............ 455/67.11 |
| 2011/0038271 A1* | 2/2011 | Shin et al. ..................... 370/252 |
| 2011/0098074 A1* | 4/2011 | Seo ........................ H04L 5/0007 455/509 |
| 2011/0235609 A1* | 9/2011 | Ahn et al. ...................... 370/329 |
| 2011/0249641 A1* | 10/2011 | Kwon et al. ................... 370/329 |
| 2011/0317777 A1* | 12/2011 | Huang et al. .................. 375/259 |
| 2012/0076042 A1* | 3/2012 | Chun et al. .................... 370/252 |
| 2012/0113939 A1* | 5/2012 | Kim et al. ...................... 370/329 |
| 2012/0172048 A1* | 7/2012 | Kato et al. ..................... 455/450 |
| 2012/0327883 A1* | 12/2012 | Yang et al. .................... 370/329 |

OTHER PUBLICATIONS

ZTE: "Initial Uplink Access Procedure in LTE-Advanced" 3GPP DRAFT: R1-090984 Initial Uplink Access Procedure in LTE-Advance. Athens, Greece; Feb. 5, 2009.

Ericsson: "Dedicated Preamble Assignment". 3GPP DRAFT; R2-085260 Prague, Czech Republic; Sep. 23, 2008.

3$^{rd}$ Generation Partnership Project; Technical Specification Group Radio Access Network; Evolved Universal Terrestrial Radio Access (E-UTRA); Further advancements for E-UTRA physical layer aspects (Release 9). 3GPP TR 36.814 v9.0.0 (Mar. 2010).

3$^{rd}$ Generation Partnership Project; Technical Specification Group Radio Access Network; Evolved Universal Terrestrial Radio Access (E-UTRA) Medium Access Control (MAC) protocol specification (Release 9). 3GPP TS 36.321 v9.1.0 (Dec. 2009).

* cited by examiner

METHODS AND APPARATUSES FOR RESOURCE MANAGEMENT IN A MULTI-CARRIER TELECOMMUNICATIONS SYSTEM

CROSS-REFERENCE TO RELATED APPLICATIONS

This application is a continuation of U.S. patent application Ser. No. 12/767,959 filed on Apr. 27, 2010, which claims benefit of U.S. Provisional Application No. 61/172,813, filed Apr. 27, 2009, and International Application No. PCT/SE2009/050945, filed Aug. 21, 2009, the disclosure of which is incorporated herein by reference.

BACKGROUND OF THE INVENTION

The present invention relates generally to the field of wireless telecommunications, and, more particularly, to methods and apparatuses for resource managements for devices operating in a multi-carrier system e.g. the LTE-advanced (Long Term Evolution) system.

The 3rd Generation Partnership Project (3GPP) is responsible for the standardization of the UMTS (Universal Mobile Telecommunication Service) system, and LTE is currently under discussion as a next generation mobile communication system of the UMTS system. LTE is a technology for realizing high-speed packet-based communication that can reach high data rates both in the downlink and in the uplink. The 3GPP work on LTE is also referred to as Evolved Universal Terrestrial Access Network (E-UTRAN). Thus work is ongoing in 3GPP to specify an evolution to UTRAN, denoted E-UTRA, as part of the LTE effort. The first release of LTE, referred to as release-8 (Rel-8) can provide peak rates of 300 Mbps, a radio-network delay of e.g. 5 ms or less, a significant increase in spectrum efficiency and a network architecture designed to simplify network operation, reduce cost, etc. In order to support high data rates, LTE allows for a system bandwidth of up to 20 MHz. LTE is also able to operate in different frequency bands and can operate in at least frequency division duplex (FDD) and time division duplex (TDD). Other operation modes can also be used. It should be noted that OFDM (orthogonal frequency division multiplexing) is supported in LTE.

For the next generation mobile communications system e.g. IMT-advanced and/or LTE-advanced, which is an evolution of LTE, support for bandwidths of up to 100 MHz is being discussed. One issue with such large bandwidth is that it is challenging to find free 100 MHz of contiguous spectrum, due to that radio spectrum a limited resource.

It should be mentioned that LTE-advanced can be viewed as a future release, denoted release-10 (Rel-10) of the LTE standard and since it is an evolution of LTE, backward compatibility is important so that LTE-advanced can be deployed in spectrum already occupied by LTE (e.g. Rel-8). This means that for a LTE user equipment or a LTE terminal, a LTE-advanced capable network can appear as a LTE network.

As mentioned earlier, in LTE-advanced that can support 100 MHz of bandwidth. This can be performed by aggregating non-continuous spectrum, to create, from e.g. a baseband point of view, a larger system bandwidth. This is also known as carrier-aggregation, where multiple component carriers are aggregated to provide a larger bandwidth. FIG. 1 illustrates an example of carrier aggregation which is aggregation of multiple component carriers. Each component carrier can appear as an LTE carrier, while an LTE-advanced terminal (or UE) can exploit the total aggregated bandwidth. As shown in FIG. 1, each bandwidth of e.g. 20 MHZ represents one component carrier. The LTE-advanced system can therefore be viewed as a multi-carrier system. Aggregation of multiple component carriers (CC) allows large bandwidth for supporting data rates of 1 Gb/s or even above, which corresponds to the throughput requirement for the (international mobile telecommunications) IMT-advanced system. Furthermore, such a scenario makes it also possible to adapt the spectrum parts to the current situation and geographical position making such a solution very flexible. To an LTE Rel-8 UE each CC (e.g. of 20 Mhz bandwidth), as shown in FIG. 1, will appear as an LTE carrier, while an LTE-advanced UE can use all 5 CCs i.e. the total aggregated bandwidth (e.g. 100 MHz) such as the one shown in FIG. 1. Thus, a Rel-8 LTE can be viewed as a single carrier system whereas a LTE-advance (Rel-10) can be viewed as a multi-carrier system.

In LTE, a UE's first access to the system is performed by means of a so called random access (RA) procedure. The objectives of the RA procedure may include: initial access; connection re-establishment, handover; scheduling request (request for radio resources); timing synchronization, and the like. The radio network nodes generally control the behavior of the UE. As an example, uplink transmission parameters like frequency, timing and power are regulated via downlink control signalling from the radio base station (known in LTE as eNB or eNodeB) to the UE. For the uplink (UL) frequency and power estimate parameters, a UE can derive those parameters from one or several downlink (control) signals.

The RA procedure can be classified into a contention-based random access procedure and a contention-free (or non-contention-based) random access procedure. The RA procedure is disclosed in the 3GPP technical specifications 3GPP TS 36.321 entitled: "3rd Generation Partnership Project; Technical Specification Group Radio Access Network; Evolved Universal Terrestrial Radio Access (E-UTRA) Medium Access Control (MAC) protocol specification (Release 8)"

As an example, for an initial access to the network, the RA procedure is contention-based in which case the UE follows a contention resolution procedure. A contention resolution allows a UE to determine whether or not resources granted by the network as a response to the RA are intended to the UE. Contention resolution is important because multiple UEs may attempt to access the system using the same common resource (e.g. physical random access channel (PRACH) and the same randomly selected preamble.

It should be noted that for the contention-based random access procedure, a plurality (or a set) of non-dedicated random access preambles are assigned per cell (i.e. to a eNB). This set is primarily used when there is UE-originated data and the UE has to establish a connection and an adequate uplink timing relation with the network through the RA procedure. When performing contention-based random access, the UE arbitrarily selects a preamble from the set as the non-dedicated random access preamble. This is known as UE initiated random access (supported in LTE). Thus for contention-based random access, the network (or the eNB) is not (immediately) aware of which UE selected which preamble. A drawback with this is that multiple UEs may in fact select the same preamble and they may attempt to access the network (or access the eNodeB) at the same time. Therefore the contention resolution mechanism is important.

Prior to accessing the single carrier system using the RA procedure, the UE needs the available set of PRACH resources for the transmission of the RA Preamble; the UE may acquire these parameters by reading the broadcasted system information of the cell or these parameters may be included in the message sent by the source eNB in case of handover.

For accessing the system when the UE is already known to the network, a contention-free RA is also possible. For performing contention-free random access, there is also defined a set of RA preambles assigned per cell (i.e. to a eNB). These preambles are known as dedicated RA preambles. The dedicated preamble is an example of a temporary unique identity to be used on the common resource, and is allocated to the UE prior to the access.

FIG. 2 illustrates a simplified flow diagram depicting steps used in a RA procedure in case of initial access (e.g. contention-based).

The contention-based RA procedure consists of four steps. In the first step, the UE transmits MSG1 which consists of a randomly selected preamble; the UE will later, on a resource calculated based in the PRACH resource used for the transmission of the preamble, monitor for a (RA) response (i.e. MSG2) from the network, which response includes the transmitted preamble.

In the second step, the UE receives and successfully decodes MSG2 containing a preamble that matches the one sent in the previous step. MSG2 includes a Temporary C-RNTI i.e. a temporary identity for the UE which purpose is to identify the UE when resolving contention and a grant for a dedicated transmission on UL-SCH (uplink shared channel).

In the third step, the UE transmits MSG3 which contains a MAC SDU filled with data from upper layers that triggered the initial access to the system. Once MSG3 is sent, the UE monitors the PDCCH (physical downlink control channel) for the Temporary C-RNTI received in the second step.

In the fourth step, the UE has successfully decoded the PDCCH for the Temporary C-RNTI; if the received MAC SDU contains a copy of the MAC SDU (media access control service data unit) transmitted in MSG3, the UE assumes that it won the contention and continues dedicated transmissions using the Temporary C-RNTI as its C-RNTI.

The RA procedure (contention based or not) can also be used when the UE is known from the network (i.e. when the UE has a valid C-RNTI) for the purpose of gaining access to uplink resources and/or uplink timing synchronization, in case the UE is not assigned dedicated resources on e.g. the PUCCH (the physical uplink control channel) for transmission of a scheduling request.

Furthermore, the RA procedure can be initiated by an PDCCH order triggered by the eNB. The eNB can send a PDCCH consistent with a PDCCH order masked with a C-RNTI and as the UE receives the PDCCH transmission, the UE initiates a RA procedure. The PDCCH order can indicate a RA preamble (or the identity of the preamble) and resource information i.e. PRACH information.

The RA procedure is also used when a UE performs a handover (HO) from a serving eNB to a target eNB. In LTE (Rel-8), the HO procedure is described in 3GPP TS 36.331 entitled "*Evolved Universal Terrestrial Radio Access (E-UTRA); Radio Resource Control (RRC)*";

In short, the source eNB starts by making a decision to handover the UE based on some criteria e.g. measurement report(s) received from the UE. Then the source eNB can prepare or setup a target eNB and further make additional preparations before transmitting a RRC (radio resource control) connection reconfiguration with mobility information message (aka HO command) towards the UE. The UE then detaches from the cell that is served by the source eNB and the UE synchronizes to the new cell served by the target eNB. Thereafter, the UE performs a RA in the new cell. The RA can be contention-free if the preamble was received in the HO command, else the previously described 4 steps for contention-based are used to perform the RA. Thereafter, the UE transmits RRC connection reconfiguration complete message. Note that additional steps are performed which are not explicitly described above.

Note also that at HO, it is possible for the target eNB to signal a dedicated preamble in the HO command to the UE which can be transmitted via the source eNB prior to the change of the serving cell. This can be performed to speed up the HO procedure by the UE in the target cell and to speed up network-initiated access by the UE in the serving cell.

As mentioned before, LTE (Rel-8) is a single carrier system in which a "cell" can correspond to only one component carrier (CC). The RA procedure, due to an ordered RA or due to a HO, is important for enabling a UE to successfully access resources and commence transmissions. Also mentioned earlier is that in LTE, a number of preambles can be reserved for dedicated use in a given cell (or in a given CC) and the dedicated preambles may be transmitted in the same PRACH resources as random preambles. Thus in single-carrier LTE, a UE can access PRACH resources in the cell (CC) for which the dedicated preamble is valid for the UE.

However, a multi-carrier system (e.g. LTE-advanced) can be defined using either a plurality of single carrier cells or as a single cell with a plurality of CCs (the latter will be assumed from this point on, however not limiting the applicability of the invention herein). In a multi-carrier system, to acquire system information, the UE may be required to first monitor the broadcasted system information in one of the carriers to determine the structure of the multi-carrier cell. The UE could then either perform random access immediately using the PRACH resources of this carrier (if allowed by the system configuration), or alternatively monitor system information on one or more of the other carriers to locate other allowed PRACH resources (if any). A carrier could also broadcast information on location of PRACH resources in other CCs, which would however represent some overhead to the system.

From the multi-carrier capable UE's perspective, the process of finding the first allowed and suitable PRACH resource and opportunity may represent considerable processing and additional latency in accessing the system and commencing transmissions. From the network's perspective, broadcasting in one or more CCs system information containing a description of the PRACH resources available in other carriers represents additional complexity and overhead. In addition, the network has little control over what resource the UE will use and thus it becomes a challenge to efficiently manage the system resource related to PRACH.

Therefore, because in a multi-carrier system several CCs are defined per cell, where PRACH resources may or may not be allocated and when allocated may be offset in time between each CC, a HO procedure and/or a PDCCH-ordered RA of a UE in such a multi-carrier cell can take long time compared to single-carrier system thereby introducing/increasing access delays or access latency e.g. HO latency and RA-ordered latency.

BRIEF SUMMARY OF THE INVENTION

It is therefore an object of the exemplary embodiments of the present invention to address the above mentioned problems and to provide improved methods and apparatuses for resource management in a multi-carrier system wherein a plurality of CCs are defined per cell (e.g. in LTE advanced system). The exemplary embodiments of the present invention relate to scenarios during a cell preparation for a HO procedure from a cell to another cell and/or due to an ordered RA.

According to a an aspect of exemplary embodiments of the present invention, the above stated problem is solved by means of a method in a radio base station (e.g. eNodeB or eNB) for resource management in a multi-carrier system wherein a plurality of component carriers are defined per cell. The method comprises: assembling, in said radio base station, a message comprising information on the structure of the multi-carrier cell served by the radio base station. The information including one or more CCs used in the cell that is/are available for the UE for performing initial access in the cell. The method further comprises, transmitting said message to the UE and indicating to the UE to what resource(s) the UE is to use for random access in the cell.

According to another aspect of exemplary embodiments of the present invention, the above stated problem is solved by means of a radio base station for resource management in a multi-carrier system wherein a plurality of component carriers are defined per cell. The radio base station comprises means (e.g. an assembler in a processing unit) configured to assemble a message comprising information on the structure of the multi-carrier cell served by the radio base station. The information including one or more CCs used in the cell that is/are available for the UE to perform initial access in the cell. The radio base station further comprises transmitting means (e.g. one or more transmitters/receivers or transceivers TX/RX) that is configured to transmit the assembled message to the UE and to indicate to said UE to what resource(s) the UE is to use for random access in the cell.

According to a further aspect of exemplary embodiments of the present invention, the above stated problem is solved by means of a method in a user equipment (UE) that is capable in operating in a multi-carrier system comprising a radio base station serving a cell wherein a plurality of carrier components are defined. The method comprising, receiving a message from the radio base station, said message being assembled by the radio base station and comprises information including one or more CCs used in the cell that is/are available to the UE for performing initial access in the cell. The method further comprises, determining, based on the received information, to what resource(s) to use in the cell; selecting one or more resources and performing a random access in the cell based in the determined information.

According to a yet another aspect of exemplary embodiments of the present invention, the above stated problem is solved by means of a user equipment (UE) that is capable in operating in a multi-carrier system comprising a radio base station serving a cell wherein a plurality of carrier components are defined. The UE comprises receiving means (e.g. a transceiver) that is configured to receive a message from the radio base station, said message being assembled by the radio base station and comprises information including one or more CCs used in the cell that is/are available for the UE to perform initial access in the cell. The UE further comprises determining means configured to determine, based on the received information, to what resource(s) to use in the cell. The UE is further configured to select one or more resources and further configured to perform a random access in the cell based on the determined information.

An advantage with the present invention is to reduce handover latency in a multi-carrier system.

Another advantage with the present invention is to reduce access delay if the UE is ordered to perform a random access in a multi-carrier cell.

Yet another advantage with the present invention is to enable a radio base station to control resource load (e.g. PRACH load) between single-carrier capable UEs (e.g. a 3GPP LTE Rel-8/9) and multi-carrier capable UEs (e.g. 3GPP LTE Rel-10 UEs and beyond).

Yet another advantage with present invention is to enable a radio base station to have means to tradeoff preamble assignment for lower latency (HO or ordered RA).

Yet another advantage with the present invention is to enable a radio base station to more efficiently allocate resources (e.g. PRACH) without necessarily impacting RA latency in the cell served by the radio base station.

Yet another advantage with the present invention is that a UE does not need to tune/read broadcasted system information for all CCs when accessing the multi-carrier cell upon HO and/or upon an ordered RA.

Still other objects and features of the exemplary embodiments of the present invention will become apparent from the following detailed description in conjunction with the accompanying drawings, attention to be called to the fact, however, that the following drawings are illustrative only, and that various modifications and changes may be made in the specific embodiments illustrated. It should further be understood that the drawings are not necessarily drawn to scale and that, unless otherwise indicated, they are merely intended to conceptually illustrate the structures and procedures described herein.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

In the following description, for purposes of explanation and not limitation, specific details are set forth such as particular architectures, scenarios, techniques, etc. in order to provide thorough understanding of the present invention. However, the difference exemplary embodiments of the present invention may be practiced in other embodiments that depart from these specific details.

The different exemplary embodiments of the present invention are described herein by way of reference to particular example scenarios. In particular, the invention is described in a non-limiting general context in relation to resource management in a multi-carrier system that is based on the third generation (3G) long term evolution (LTE) concept (e.g. LTE-advanced) wherein a plurality of component carriers (CC) can be defined per cell. It should be noted that the present invention is not restricted to 3G LTE-advanced but can be applicable in other wireless multi-carrier systems wherein random access procedures in connection with handover and/or a PDCCH-ordered random access can be performed.

Figure 1:
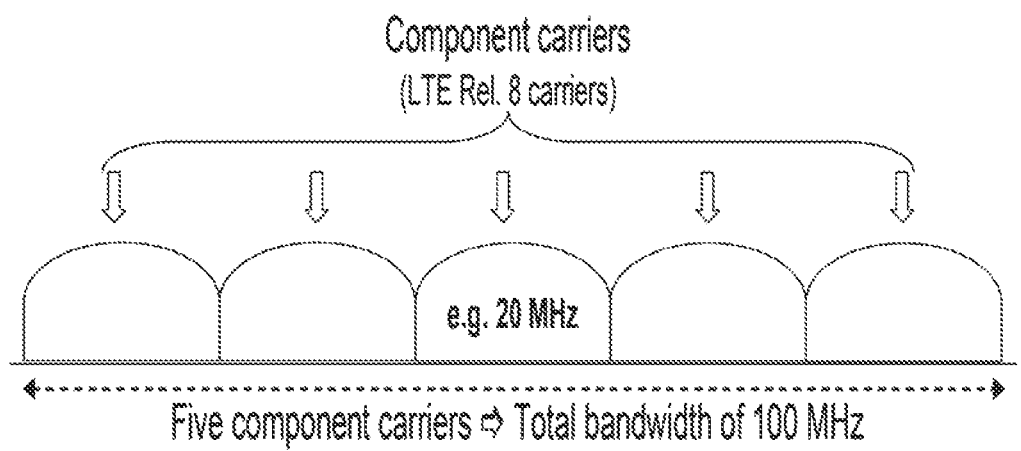
FIG. 1 is a diagram illustrating an example of aggregation of multiple component carriers in LTE.
Figure 2:
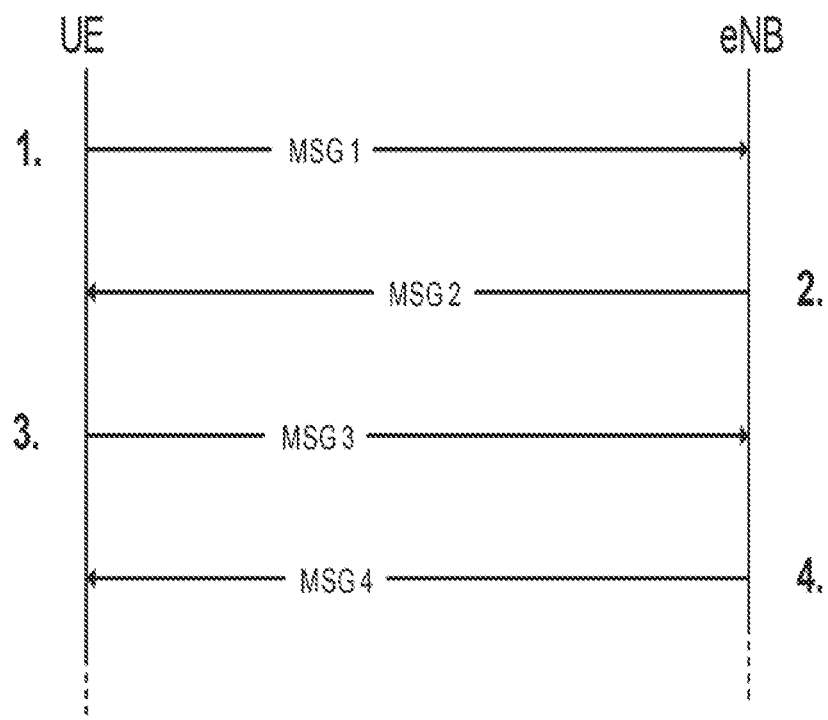
FIG. 2 is a simplified diagram illustrating four steps in a RA procedure in case of initial access.
Figure 3:
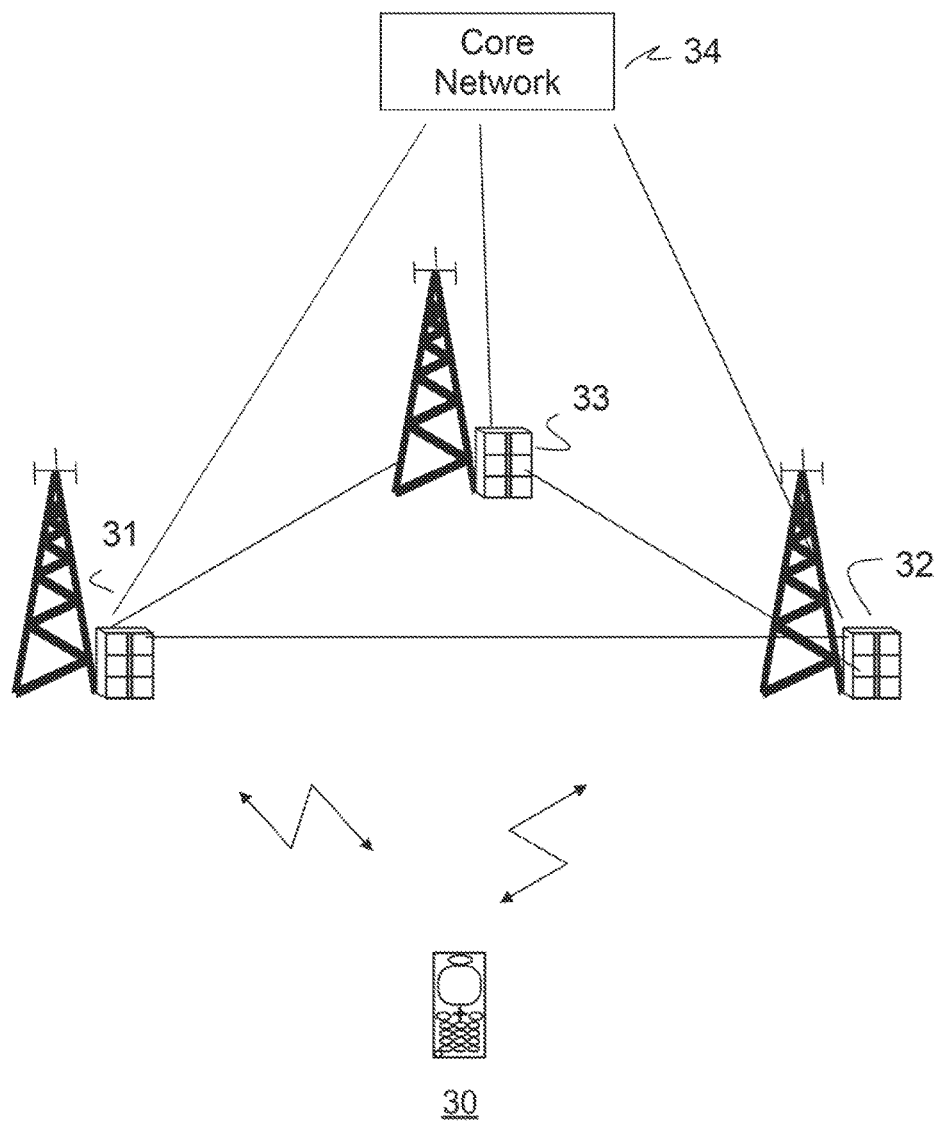
FIG. 3 is a simplified diagram illustrating an exemplary wireless telecommunications system wherein exemplary embodiments of the present invention can be applied.

Referring to FIG. 3, there is illustrated a block diagram of an exemplary wireless telecommunications network system in which the different exemplary embodiment of the present invention may be applied. Note that the system depicted in FIG. 3 only shows transceivers or nodes that are necessary for understanding the different exemplary embodiments of the present invention. As shown, the system, which can be represented by a LTE system (LTE Rel-8 and/or Rel-10), comprises a number of user equipments UE 30 (only one is shown), and apparatuses acting as radio base stations (eNBs) 31, 32 and 33. One of the functions of the eNodeBs is to control traffic to and from UEs in a cell. A UE is suitable to be used as a mobile phone, a wireless terminal, a laptop, a personal computer, a personal digital assistant, a voice over internet protocol (VoIP) capable phone or any other 3GPP LTE capable equipment. Traffic, over a radio link, from a eNodeB to a UE is referred to as downlink (DL) traffic and traffic, over a radio link, from the UE to a eNB is referred to as uplink (UL) traffic. Note that in FIG. 3, the number of UEs and eNBs is only illustrative and the embodiments of the present invention are not restricted to any particular number of UEs and/or number of eNBs. The figure also depicts a core network 34 to which the eNBs 31, 32 and 33 can be connected.

In FIG. 3, it is assumed that eNB 31 is serving a single-carrier cell i.e. eNB 31 can represent a Rel-8 LTE eNB. eNB 32 can represent a LTE-advanced eNB that can serve a multi-carrier cell wherein a plurality of CCs can be defined. eNB 33 can be a LTE eNB or a LTE-advanced eNB. Furthermore, a number of dedicated preambles can be reserved for dedicated use in a given cell to a eNB, and dedicated preambles are transmitted in the same PRACH resources as random preambles. The single carrier cell (not shown) that is served by eNB 31, corresponds to one CC, whereas the multi-carrier cell (not shown) that is e.g. served by eNB 32, corresponds to a plurality of CCs.

It should be noted that in LTE, the setting of random access channel (RACH) parameters may depend on a multitude of factors e.g. the uplink inter-cell interference (from PUSCH), RACH load (call arrival rate, HO rate, tracking area update, and traffic pattern and population under the cell coverage as it affects the UL synchronization states and hence the need to use random access), the cubic metric of the preambles allocated to a cell, whether the cell is in high-speed mode or not, and UL and DL imbalances. As an example, an automatic RACH (optimization) function may monitor the prevailing conditions, e.g., changes on RACH load, uplink interference, and may determine and update the appropriate parameters such that requirements on performance are satisfied.

Furthermore, optimal RACH performance is key to obtain high coverage and low delays, e.g., call setup delays, data resuming delays from the UL unsynchronized state, and handover delays. A poorly configured RACH may result in low preamble detection probability and low coverage. Further if RACH is not dimensioned according to prevailing traffic load, then this may result in unnecessarily high access delays. Since random access is the first step taken in order to commence services, it is important that the performance of RACH is satisfactory. RACH performance will have an effect on multiple features and characteristics that are necessary from early network operation, e.g., cell coverage, access delay, and handover performance. RACH optimization aims at setting the optimum RACH coverage and random access delay in early network deployment. For example, the coverage of a cell is limited by the RACH coverage. Further, RACH parameters need to be updated if there are parameter/configuration changes due to eNB SON (self-organized network)/RRM (radio resource management) functions and/or network configuration setting, e.g. antenna tilting, transmission power settings and handover threshold. As such, the ability to auto tune the RACH capacity and coverage would likely be a precondition, and seems essential to enabling auto tuning of other parameters, since the RACH performance is probably affected by execution of other SON functions.

It should be noted that for LTE-advanced, 3GPP has discussed that it shall be possible for both single carrier and multi-carrier capable UEs to operate in each CC independently.

Given the assumptions that (1) preambles for PRACH are consequently expected to be handled by the network in a similar manner as for LTE Rel-8 and that (2) the validity of dedicated preambles are expected to remain per CC, it may be useful to consider the multi-carrier structure of a cell in relation to the use of common resources e.g. PRAH resources.

This may have the following implications for a UE supporting multi-carriers:
the UE would e.g. access PRACH resources in the CC for which the dedicated preamble is valid for that UE;
the UE, for which the network intends to reduce access latency by providing means for this UE to perform a contention-free access RA, maybe cannot use a PRACH opportunity in a specific CC unless the UE has a dedicated preamble for that CC.

Furthermore, considering that for a multi-carrier cell the network could configure PRACH resources with different time locations in different CCs to e.g. improve RA latency for UEs supporting multi-carrier while keeping the overall capacity and resource allocation at the same level of efficiency as for a single carrier system, efficient handling of allocation of dedicated preambles is important.

Assume for example that UE 30 in FIG. 3 is served by eNB 31 and is to perform a HO to the multi-carrier cell that is served by eNB 32. Thus in this case eNB 31 is a source eNB and eNB 32 is a target eNB. According to an exemplary embodiment of the present invention, eNB 32 is configured to construct/assemble a message corresponding to a HO command and to transmit this to the UE 30 transparently via the source eNB 31. The message may comprise information on the structure of the multi-carrier cell. The information may include e.g. a number of CCs, a list of one or more allowed CCs for PRACH access which may comprise a corresponding dedicated preamble, and may further include a PRACH configuration for the CC(s) in the list.

For example, to reduce latency at HO using a contention-free RA procedure, the HO command may include the cell carrier structure, one or more dedicated preamble(s) together with an indication of what CC the preamble is valid. The received information indicating to what resources the UE should use in the multi-carrier cell, can be used by the UE to determine in what CC it can (earliest) perform RA and to select the available (e.g. first available) PRACH resource for the RA in that CC of the target cell served by the target eNB 32.

According to an exemplary embodiment of the present invention, the resource management function/method in the eNB 32 is thus configured to determine what PRACH resources and CC combination(s) a UE can use for the initial access to the cell.

It should be noted that the exemplary embodiments of the present invention are not restricted to HO i.e. the above described resource management method/function in the eNB is also applicable to a PDCCH-ordered RA ordered by e.g. a serving eNB to the UE.

As mentioned above, the resource management function/method in the eNB is configured to determine e.g.:

what CC (or subset of CCs) the UE shall use for initial access in the target cell (for contention-based or contention-free random access), This can, for example, be based on: PRACH configuration (timing, resource allocation) in each CC, or PRACH load in each CC;

what dedicated preamble(s) to use for the initial random access in the target cell for the CC (or for the subset of CCs) in which the UE is allowed to perform the initial access.

The message (HO command or RA-order) assembled by the eNB and transmitted to the UE by the serving eNB or by the source eNB (in case of HO) or by the target eNB via the source eNB (in case of HO) or by the target eNB, in order to direct the UE or to steer the UE or to indicate to the UE the intended PRACH resource(s), may thus comprise, in accordance with an exemplary embodiment of the present invention:

information on the structure of the multi-carrier cell, which comprises one or more CCs (e.g. a number of CCs) and/or the identity of the CC(s) (CCids), and/or the carrier frequency(ies) (carrierFreq), and/or the bandwidth per carrier (carrierBandwidth), and/or one or several timers e.g. the timer T304, etc.

In accordance with an exemplary embodiment of the present invention, the information may further comprise one or more default uplink component carrier(s) for subsequent PRACH access (e.g. one or more of the CCid(s) above). The information may further comprise one or more default downlink component carrier(s) (e.g. one or more of the CCid(s) above) associated with an uplink component carrier for subsequent PRACH access. The information may further comprise one or more default uplink-downlink component carrier pair(s) (e.g., identified by one or more of the CCid(s) above) for subsequent PRACH access on the uplink component carrier. The information may further include a dedicated preamble for each of the CCs for which the UE is allowed to use PRACH resources (e.g. RACH-ConfigDedicated with ra-PreambleIndex and ra-PRACH-MaskIndex for one or more of the CCid(s) above). The information may further comprise additional information not explicitly described above i.e. the exemplary embodiments of the present invention are not restricted to the above described information.

As mentioned before, when the UE receives said information in the HO command or in the PDCCH-RA order, it determines in what CC it can e.g. earliest perform RA and it can then select the first available resource for performing the random access in that CC of the cell (e.g. target cell).

This way, the UE does not need to tune/read the broadcasted system information for all CCs when accessing the multi-carrier cell upon HO or upon ordered RA thereby reducing HO latency and delay when performing random access. In addition, the tradeoff between overall PRACH capacity and latency performance is improved.

Accordance to another exemplary embodiment of the present invention a serving (or a source) eNB can send/signal the HO command message with only one CC frequency and then the UE can read system information on that CC frequency in order to gain or listen to the multi-cell structure information and then the UE can peak one of the carriers e.g. randomly or selectively, in order to determine what PRACH resource to use in that carrier and then perform the random access. The UE may also read system information on the carrier frequency in the received message to gain in that carrier and perform random access. As mentioned earlier, the exemplary embodiments of the present invention are also applicable for a RA-order. It should be noted that for a RA-order or for a HO command, the indicated cell for random access in said order or command can be indicated to become the serving cell using e.g. a cell ID. As an example, if we assume that one cell corresponds to one CC and the other carriers can serve as resources, then the UE can see one of these carriers as the serving cell and this could also be indicated (using e.g. CCid) in the command or order. Thus, by signalling one CC as the CC to perform random access for the cell, one could also signal one CC as being the serving cell. The signaled CC can be the same as the CC used to perform random access. In this case, the CC becomes the serving cell from the UE's perspective. On the other hand, if we assume that one cell corresponds to multiple CCs then one CC can be signaled (in the HO command or RA-order) as the CC to perform random access in the cell and one could also signal one CC as the anchor for the serving cell. Thus, a property of a CC can be sent in the HO command or RA order for the purpose of initial access. It should be noted that the information regarding the structure of the cell can comprise information about one CC and that additional CCs can be configured later using dedicated signalling.

Figure 4:
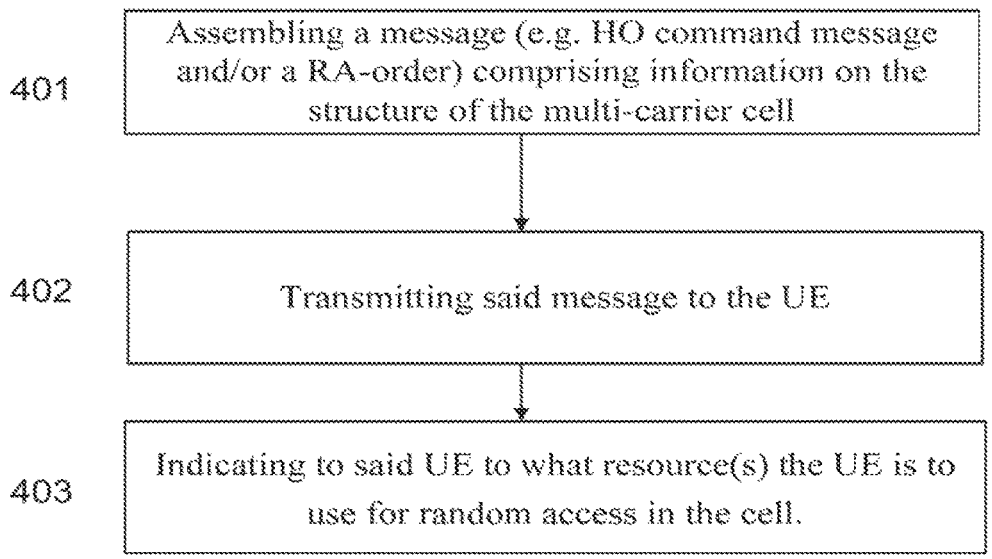
FIG. 4 is a diagram illustrating a flowchart of a method performed, in a radio base station (eNB), according to exemplary embodiments of the present invention.

Referring to FIG. 4 there is described a flowchart of a method for resource management aimed to be performed/implemented in radio base station e.g. a eNB or a eNodeB capable in operating in a multi-carrier system wherein cells are allocated a plurality of CCs. As shown, the main steps comprise:

(401) assembling a message (e.g. HO command message and/or a RA-order) comprising information on the structure of the multi-carrier cell served by the radio base station. The information comprising one or more CCs used in the cell that a UE can use for initial access in the cell.

(402) transmitting said message to the UE and (403) indicating to said UE to what resource(s) the UE is to use for random access in the cell.

Details on what information can be included in the message from the eNB to the UE have been previously described and are therefore not unnecessarily repeated again.

Figure 5:
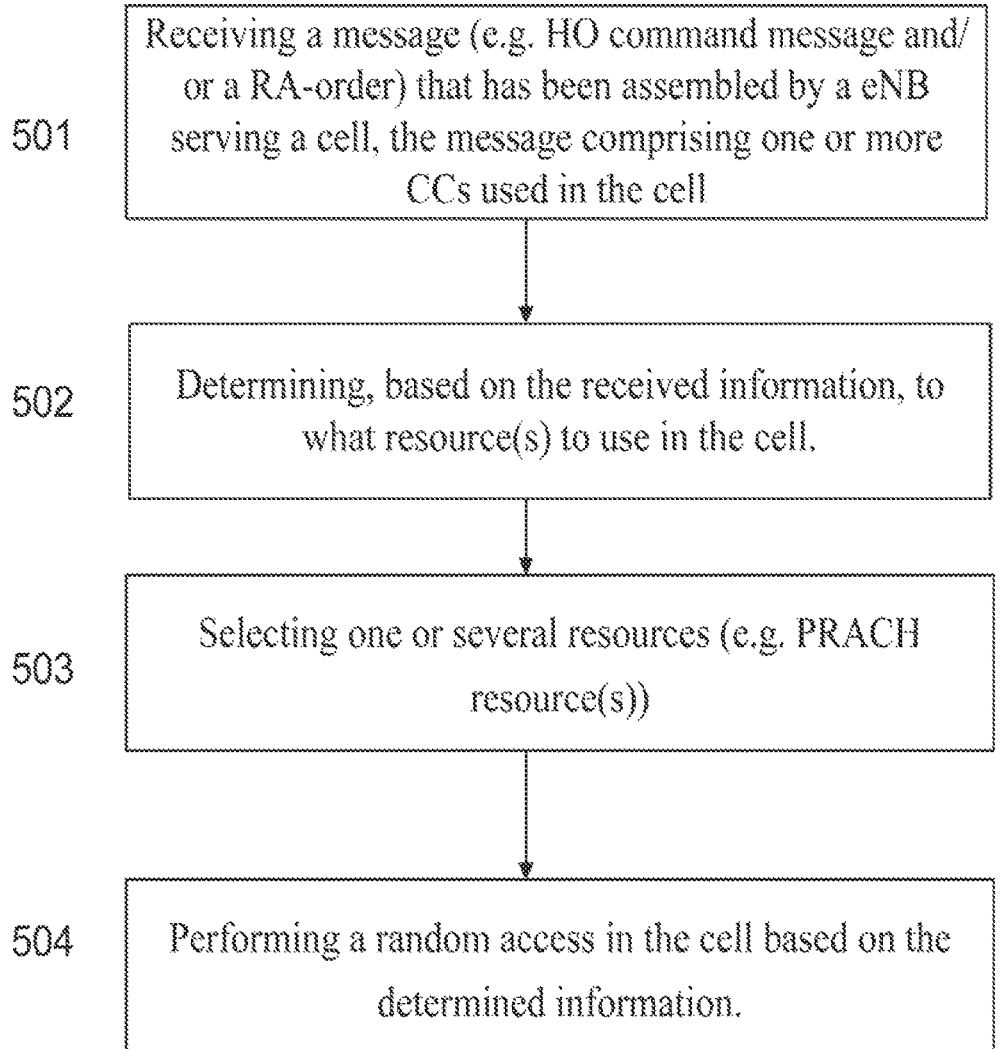
FIG. 5 is a diagram illustrating a flowchart of a method, performed in a user equipment (UE) according to exemplary embodiments of the present invention.

Referring to FIG. 5 there is described a flowchart of a method aimed to be performed/implemented in UE e.g.

capable in operating in a multi-carrier system wherein cells are allocated a plurality of CCs. As shown, the main steps comprise:

(501) receiving a message (e.g. a HO command message and/or a RA-order) that has been assembled by a eNB, the message including one or more CCs used in the cell that a UE can use for initial access in the cell.

(502) determining, based on the received information, to what resource(s) to use in the cell.

(503) selecting one or several resources (e.g. PRACH resource(s))

(504) performing a random access in the cell based on the determined information.

Figure 6:
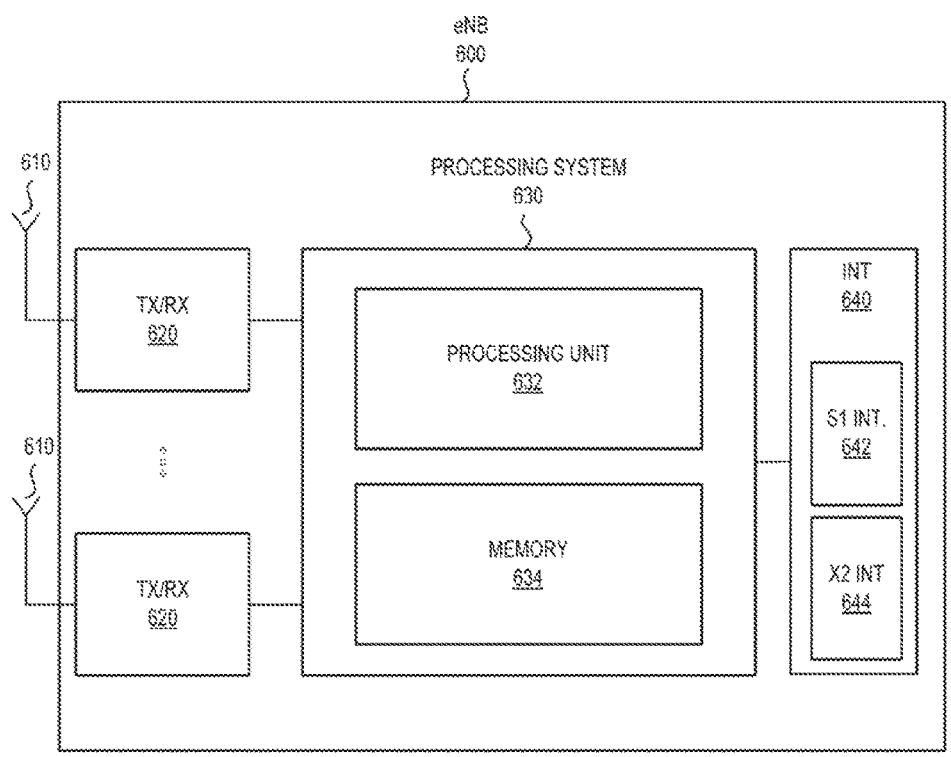
FIG. 6 illustrates a block diagram of an exemplary radio base station (eNB) according to embodiments of the present invention.

Referring to FIG. 6 there is illustrated a block diagram of an exemplary radio base station 600 (e.g. eNB or eNodeB). Exemplary components of eNB 600 are shown. As illustrated, eNB 600 may include antennas 610, transceivers 620, a processing system 630, and an interface 640. Antennas 610 may include one or more directional and/or omni-directional antennas. Transceivers 620 may be associated with antennas 610 and include transceiver circuitry for transmitting and/or receiving symbol sequences in a network via antennas 610. Processing system 630 may control the operation of eNB 600. Processing system 630 may also process information received via transceivers 620 and interface 640. As illustrated, processing system 630 may include processing logic 632 and a memory 634. It will be appreciated that processing system 630 may include additional and/or different components than illustrated in FIG. 6. Processing logic 632 may include a processor, microprocessor, an ASIC, FPGA, or the like. Processing logic 632 may process information received via transceivers 620 and interface 640. The processing logic 632 may also act as an assembler which is configured, in accordance with exemplary embodiments of the present invention, to assemble a message comprising information on the structure of the multi-carrier cell served by eNB 600. The information comprising one or more CCs used in the cell that a UE can use for initial access in the cell. The eNB 600 transceiver 620 (e.g. one or more transmitters/receivers or transceivers TX/RX in combination with antenna(s)) is configured to transmit the assembled message to the UE and to indicate to said UE to what resource(s) the UE is to use for random access in the cell.

The processing may include, for example, data conversion, forward error correction (FEC), rate adaptation, Wideband Code Division Multiple Access (WCDMA) spreading/dispreading, and quadrature phase shift keying (QPSK) modulation etc. In addition, processing logic 632 may generate control messages and/or data messages and cause those control messages and/or data messages to be transmitted via transceivers 620 and/or interface 640. Processing logic 632 may also process control messages and/or data messages received from transceivers 620 and/or interface 640. Memory 634 may include a RAM, a ROM, and/or another type of memory to store data and instructions that may be used by processing logic 632.

Interface 640 may include one or more line cards that allow eNB 600 to transmit data to and receive data from other devices over wired and/or wireless connections. As illustrated, interface 640 may include an S1 interface 642 that allows eNB 600 to communicate, for example, with a MME/GW (mobility management entity/gateway), and an X2 interface 644 that allows eNB 600 to communicate with another eNB. eNB 600 may perform certain operations in response to processing logic 632 executing software instructions contained in a computer-readable medium, such as memory 634. A computer-readable medium may be defined as one or more physical and/or logical memory devices. The software instructions may be read into memory 634 from another computer-readable medium or from another device via interface 640. The software instructions contained in memory 634 may cause processing logic 632 to perform processes described herein. Alternatively, hardwired circuitry may be used in place of or in combination with software instructions to implement processes/function/method described herein. Thus, embodiments described herein are not limited to any specific combination of hardware circuitry and software.

Although FIG. 6 shows exemplary components of eNB 600, in other implementations, eNB 600 may contain fewer, different, or additional components than depicted in FIG. 6. In still other implementations, one or more components of eNB 600 may perform the tasks described as being performed by one or more other components of eNB 600.

Figure 7:
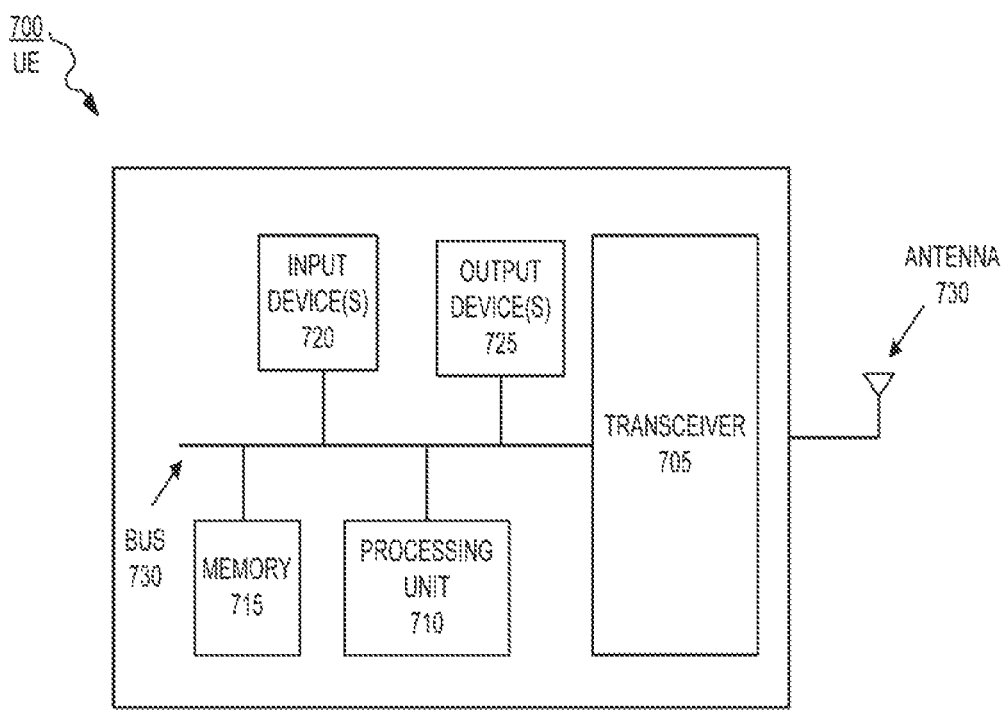
FIG. 7 illustrates a block diagram of an exemplary user equipment (UE) according to exemplary embodiments of the present invention.

Referring to FIG. 7 there is illustrated a diagram of exemplary components of UE 700. As illustrated, UE 700 may include one or several antennas (only one antenna is shown) 730, a transceiver 705, processing logic 710, a memory 715, an input device(s) 720, an output device(s) 725, and a bus 730. Antenna 730 may include one or more antennas to transmit and/or receive radio frequency (RF) signals over the air. Antenna 730 may, for example, receive RF signals from transceiver 705 and transmit the RF signals over the air to an eNB and receive RF signals over the air from said eNB and provide the RF signals to transceiver 705. Antenna 730 in combination with transceiver 705 is therefore configured to receive, as previously described, a message (e.g. HO command message and/or a RA-order) that has been assembled by a eNB, the message comprising one or more CCs used in of the multi-carrier cell served by a radio base station that the UE can use for initial access in the cell.

Transceiver 705 may include, for example, a transmitter that may convert baseband signals from processing logic 710 to RF signals and/or a receiver that may convert RF signals to baseband signals. Alternatively, transceiver 705 may include a transceiver to perform functions of both a transmitter and a receiver. Transceiver 705 may connect to antenna 730 for transmission and/or reception of the RF signals.

Processing logic 710 may include a processor, microprocessor, an application specific integrated circuit (ASIC), field programmable gate array (FPGA), or the like. Processing logic 710 may control operation of UE 700 and its components. The processing unit 710 may therefore, determine based on the information received in the HO command or in the RA-order command to what resource(s) to use in the cell. As previously described, the received information comprises on one or more CCs used in the cell that is/are available for the UE to or the information comprises information on the structure of the multi-carrier cell including the one or more CCs. The processing logic 710 may also be responsible in selecting one or several resources (e.g. PRACH resource(s)). The UE 700 is also configured to performing a random access in the cell based on the determined information.

Referring to FIG. 7, the UE further comprises a memory 715 which may include a random access memory (RAM), a read only memory (ROM), and/or another type of memory to store data and instructions that may be used by processing logic 710. Input device(s) 720 may include mechanisms for entry of data into UE 700. For example, input device(s) 720 may include input mechanisms, such as microphone, input elements, display, etc. Output device(s) 725 may include mechanisms for outputting data in audio, video and/or hard copy format. For example, output device(s) 725 may include speaker, display, etc. Bus 730 may interconnect the various components of UE 700 to permit the components to communicate with one another.

Although FIG. 7 shows exemplary components of UE 700, in other implementations, UE 700 may contain fewer, different, or additional components than depicted in FIG. 7. In still other implementations, one or more components of UE 700 may perform the tasks described as being performed by one or more other components of UE 700.

Figure 8:
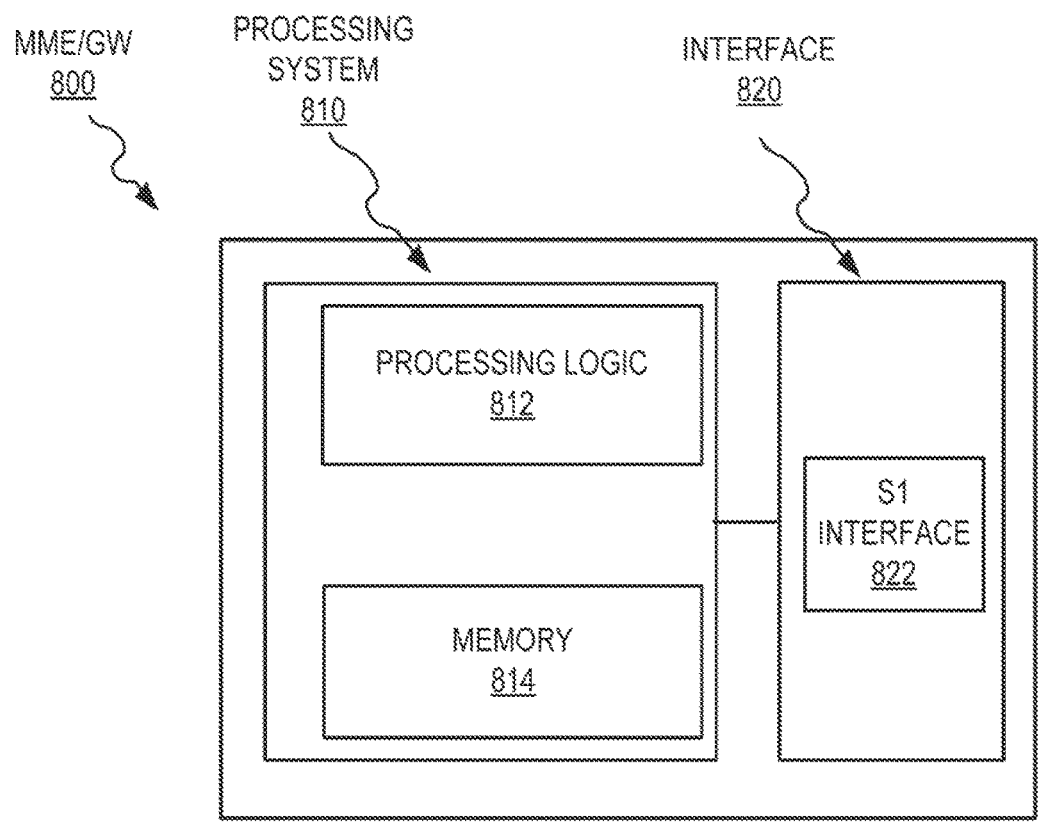
FIG. 8 illustrates a block diagram of an exemplary MME/GW.

As mentioned earlier, the eNB can communicate with a MME/GW. FIG. 8 is a diagram of exemplary components of MME/GW 800 capable in communicating with e.g. eNB 600 of FIG. 6. As illustrated, MME/GW 800 may include a processing system 810 and an interface 820. Processing system 810 may control the operation of MME/GW 800. Processing system 810 may also process information received via interface 820. As illustrated, processing system 810 may include processing logic 812 and a memory 814. It will be appreciated that processing system 810 may include additional and/or different components than illustrated in FIG. 8.

Processing logic 812 may include a processor, microprocessor, an ASIC, FPGA, or the like. Processing logic 812 may process information received via interface 820. In addition, processing logic 812 may generate control messages and/or data messages and cause those control messages and/or data messages to be transmitted via interface 820. Processing logic 812 may also process control messages and/or data messages received from interface 820. Memory 814 may include a RAM, a ROM, and/or another type of memory to store data and instructions that may be used by processing logic 812.

Interface 820 may include one or more line cards that allow MME/GW 800 to transmit data to and receive data from other devices over wired and/or wireless connections. As illustrated, interface 820 may include an S1 interface 822 that allows MME/GW 800 to communicate, for example, with eNB 600. It will be appreciated that interface 820 may include additional interfaces than illustrated in FIG. 8. For example, interface 820 may include an interface for communicating with another network, such as a PDN (packet data network).

MME/GW 800 may perform certain operations in response to processing logic 812 executing software instructions contained in a computer-readable medium, such as memory 814. The software instructions may be read into memory 814 from another computer-readable medium or from another device via interface 820. The software instructions contained in memory 814 may cause processing logic 812 to perform processes described herein. Alternatively, hardwired circuitry may be used in place of or in combination with software instructions to implement processes described herein.

It should be noted that the exemplary embodiments described herein are not limited to any specific combination of hardware circuitry and software.

The present invention and its embodiments can be realized in many ways. For example, one embodiment of the present invention includes a computer-readable medium having instructions stored thereon that are executable by a radio base station (e.g. eNodeB or eNB) and/or a UE of a telecommunications system. The instructions executable by the radio base station and/or the UE and stored on a computer-readable medium perform the method steps of the present invention as previously described.

What is claimed:

1. A radio base station operable in a multi-carrier system comprising a plurality of component carriers (CCs), comprising:
   a processing unit; and
   a memory including computer program code, wherein the processing unit, the memory, and the computer program code are collectively configured to:
   assemble a message including information on the plurality of CCs, of which only one CC is identified along with a dedicated preamble for a physical random access channel (PRACH) resource within the CC for random access within the multi-carrier system; and
   provide the message and an indication of the PRACH resource to direct a user equipment to use the dedicated preamble for the PRACH resource within the CC to perform the random access within the multi-carrier system.

2. The radio base station according to claim 1 wherein the message comprises an indicator that the dedicated preamble is valid with respect to the CC.

3. The radio base station according to claim 1 wherein the message comprises a PRACH configuration and/or a PRACH load with respect to the CC.

4. The radio base station according to claim 1 wherein the message comprises an identity (CCid) of the CC, a carrier frequency (carrierFreq) for the CC, a bandwidth (carrierBandwidth) for the CC, and/or at least one timer.

5. The radio base station according to claim 1 wherein the message identifies another CC of the plurality of CCs and another dedicated preamble for another PRACH resource within the another CC to perform a subsequent random access within the multi-carrier system.

6. The radio base station according to claim 1 wherein the processing unit, the memory, and the computer program code are collectively configured to provide the message and the indication of the PRACH resource to direct the user equipment to use the dedicated preamble for the PRACH resource within the CC to perform initial random access within the multi-carrier system.

7. The radio base station according to claim 1 wherein the PRACH resource comprises time-frequency resources within the CC to perform the random access within the multi-carrier system.

8. The radio base station according to claim 1 wherein the message is part of a handover command to prepare for a handover procedure or part of a physical downlink control channel (PDCCH) random access order for the user equipment.

9. A method performed by a radio base station in a multi-carrier system comprising a plurality of component carriers (CCs), comprising:
   assembling a message including information on the plurality of CCs, of which only one CC is identified along with a dedicated preamble for a physical random access channel (PRACH) resource within the CC for random access within the multi-carrier system; and
   providing the message and an indication of the PRACH resource to direct a user equipment to use the dedicated preamble for the PRACH resource within the CC to perform the random access within the multi-carrier system.

10. The method according to claim 9 wherein the message comprises an indicator that the dedicated preamble is valid with respect to the CC.

11. The method according to claim 9 wherein the message comprises a PRACH configuration and/or a PRACH load with respect to the CC.

12. The method according to claim 9 wherein the message comprises an identity (CCid) of the CC, a carrier frequency (carrierFreq) for the CC, a bandwidth (carrierBandwidth) for the CC, and/or at least one timer.

13. The method according to claim 9 wherein the message identifies another CC of the plurality of CCs and another dedicated preamble for another PRACH resource within the another CC to perform a subsequent random access within the multi-carrier system.

14. The method according to claim 9 wherein the providing comprises providing the message and the indication of the PRACH resource to direct the user equipment to use the dedicated preamble for the PRACH resource within the CC to perform initial random access within the multi-carrier system.

15. The method according to claim 9 wherein the PRACH resource comprises time-frequency resources within the CC to perform the random access within the multi-carrier system.

16. The method according to claim 9 wherein the message is part of a handover command to prepare for a handover procedure or part of a physical downlink control channel (PDCCH) random access order for the user equipment.

17. A user equipment operable in a multi-carrier system comprising a plurality of component carriers (CCs), comprising:
a processing unit; and
a memory including computer program code, wherein the processing unit, the memory, and the computer program code are collectively configured to:
receive a message including information on the plurality of CCs, of which only one CC is identified along with a dedicated preamble for a physical random access channel (PRACH) resource within the CC for random access within the multi-carrier system; and
perform the random access within the multi-carrier system using the PRACH resource and the dedicated preamble for the PRACH resource within the CC.

18. The user equipment according to claim 17 wherein the message comprises an indicator that the dedicated preamble is valid with respect to the CC.

19. The user equipment according to claim 17 wherein the processing unit, the memory, and the computer program code are collectively configured to perform initial random access within the multi-carrier system using the PRACH resource and the dedicated preamble for the PRACH resource within the CC.

20. The user equipment according to claim 17 wherein the message comprises an identity (CCid) of the CC, a carrier frequency (carrierFreq) for the CC, a bandwidth (carrierBandwidth) for the CC, and/or at least one timer.

21. The user equipment according to claim 17 wherein the message identifies another CC of the plurality of CCs and another dedicated preamble for another PRACH resource within the another CC to perform a subsequent random access within the multi-carrier system.

22. The user equipment according to claim 17 wherein the PRACH resource comprises time-frequency resources within the CC to perform the random access within the multi-carrier system.

23. The user equipment according to claim 17 wherein the message is part of a handover command to prepare for a handover procedure or part of a physical downlink control channel (PDCCH) random access order for the user equipment.

24. The user equipment according to claim 17 wherein the processing unit the memory, and the computer program code are collectively configured to read system information with respect to the plurality of CCs to acquire information on a structure of the multi-carrier system.

25. A method performed by a user equipment in a multi-carrier system comprising a plurality of component carriers (CCs), comprising:
receiving a message including information on the plurality of CCs, of which only one CC is identified along with a dedicated preamble for a physical random access channel (PRACH) resource within the CC for random access within the multi-carrier system; and
performing the random access within the multi-carrier system using the PRACH resource and the dedicated preamble for the PRACH resource within the CC.

26. The method according to claim 25 wherein the message comprises an indicator that the dedicated preamble is valid with respect to the CC.

27. The method according to claim 25 wherein the message comprises a PRACH configuration and/or a PRACH load with respect to the CC.

28. The method according to claim 25 wherein the performing comprises performing initial random access within the multi-carrier system using the PRACH resource and the dedicated preamble for the PRACH resource within the CC.

29. The method according to claim 25 wherein the message comprises an identity (CCid) of the CC, a carrier frequency (carrierFreq) for the CC, a bandwidth (carrierBandwidth) for the CC, and/or at least one timer.

30. The method according to claim 25 wherein the message identifies another CC of the plurality of CCs and another dedicated preamble for another PRACH resource within the another CC to perform a subsequent random access within the multi-carrier system.

31. The method according to claim 25 wherein the PRACH resource comprises time-frequency resources within the CC to perform the random access within the multi-carrier system.

32. The method according to claim 25 wherein the message is part of a handover command to prepare for a handover procedure or part of a physical downlink control channel (PDCCH) random access order for the user equipment.

33. The method according to claim 25 further comprising reading system information with respect to the plurality of CCs to acquire information on a structure of the multi-carrier system.

* * * * *

UNITED STATES PATENT AND TRADEMARK OFFICE
CERTIFICATE OF CORRECTION

PATENT NO. : 10,237,851 B2
APPLICATION NO. : 14/085473
DATED : March 19, 2019
INVENTOR(S) : Wager et al.

Page 1 of 1

It is certified that error appears in the above-identified patent and that said Letters Patent is hereby corrected as shown below:

In the Specification

In Column 1, Line 10, delete "2010," and insert -- 2010, now Pat. No. 8,620,335, --, therefor.

Signed and Sealed this
First Day of September, 2020

Andrei Iancu
*Director of the United States Patent and Trademark Office*